July 7, 1925.
M. M. McFARLAND
SUITCASE BALLOT BOX
Filed March 14, 1924
1,545,435
2 Sheets-Sheet 1
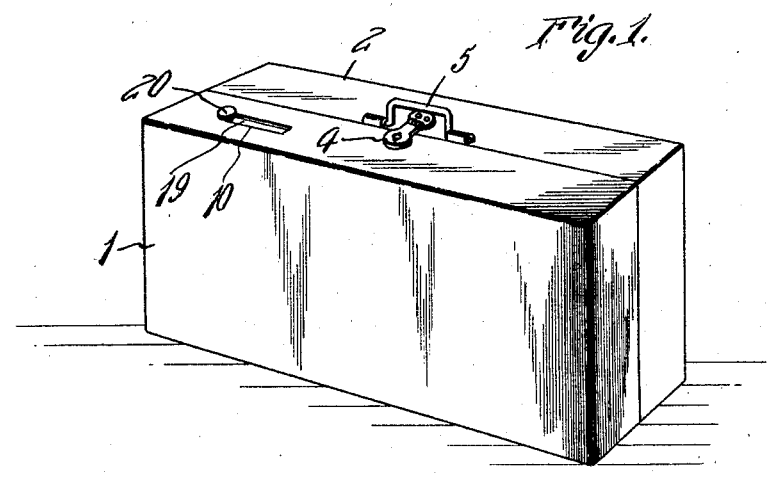
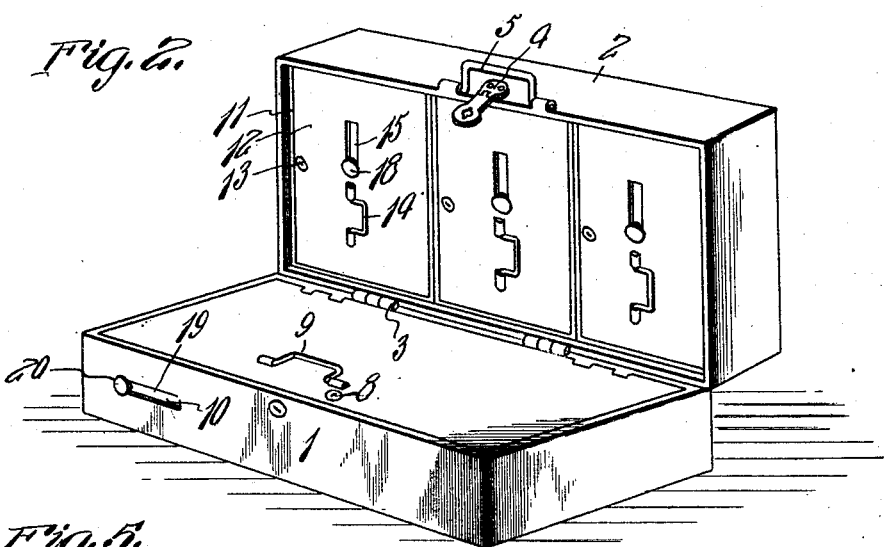
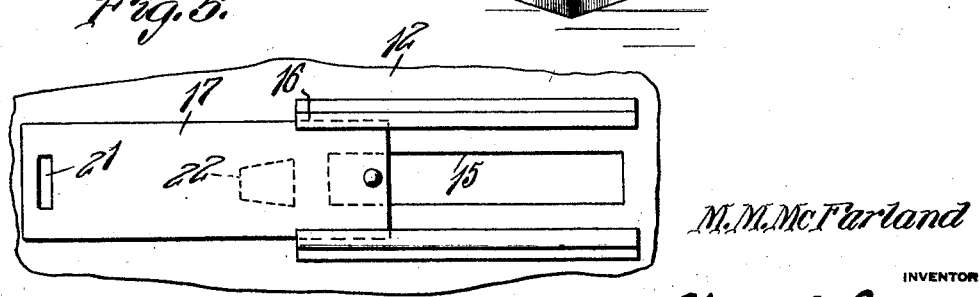

July 7, 1925.
M. M. McFARLAND
SUITCASE BALLOT BOX
Filed March 14, 1924
1,545,435
2 Sheets-Sheet 2
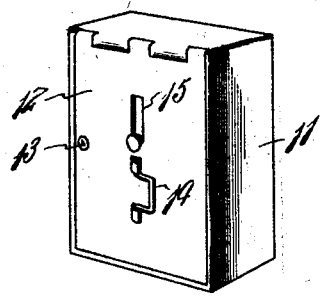
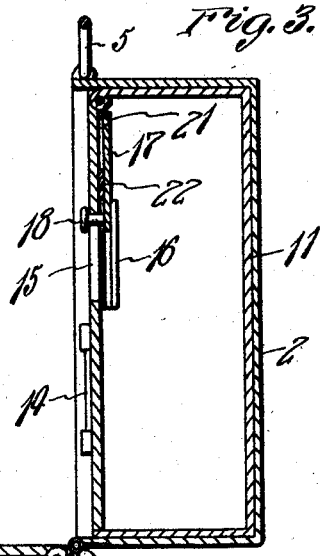
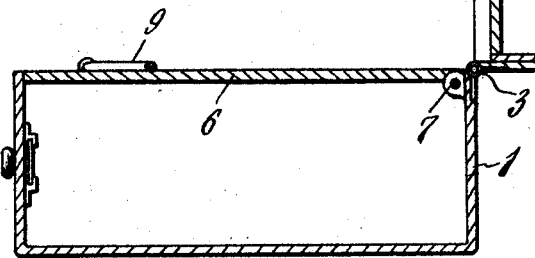
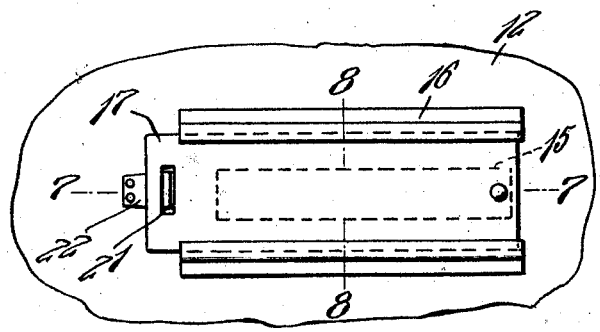
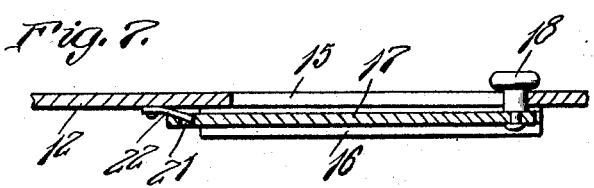
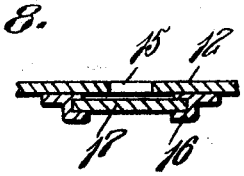
M. M. McFarland
INVENTOR
BY Victor J. Evans
ATTORNEY
WITNESS:

Patented July 7, 1925.

1,545,435

UNITED STATES PATENT OFFICE.

MARION M. McFARLAND, OF SAN ANTONIO, TEXAS.

SUITCASE BALLOT BOX.

Application filed March 14, 1924. Serial No. 699,283.

*To all whom it may concern:*

Be it known that I, MARION M. McFARLAND, a citizen of the United States, residing at San Antonio, in the county of Bexar and State of Texas, have invented new and useful Improvements in Suitcase Ballot Boxes, of which the following is a specification.

An object of this invention is the construction of a ballot box of suitcase formation to render the same convenient in handling, easy to transport to and from various voting precincts, and also wherein the case may be effectively sealed and readily stored with the voting ballots therein for the time required by the laws of the various States.

A further object is the provision of a ballot box in the nature of a suitcase comprising two similar hingedly connected sections having means for locking the same together, a hinged and normally closed flap closing one of the sections, and in this section there are initially stored ballots and other voting paraphernalia, but thereafter the said section may be employed as a ballot box as well as a storage for the voted ballots, the second section provides a receptacle for removable ballot boxes all of which have normally locked doors and provided with slots for the passage of the ballots thereinto, the said slots designed to be covered by slides which are automatically locked in closed position after the ballots have been voted, a similar slot and a slide being also provided in the first mentioned section.

A still further object is the provision in a ballot box having a slot for the passage of ballots thereinto, of a slide for covering the slot and means for automatically locking the slide in slot covering position, whereby access cannot be obtained to the interior of the box until the normally locked cover therefor is opened.

To the attainment of the foregoing and other objects which will present themselves as the nature of the invention is better understood, reference is to be had to the drawings which accompany and which form part of this application, and in which:—

Figure 1 is a perspective view of the improvement in closed position.

Figure 2 is a similar view of the improvement in open position.

Figure 3 is an approximately central transverse sectional view through the construction disclosed in Figure 2.

Figure 4 is a perspective view of one of the removable ballot boxes.

Figure 5 is a rear elevation of a portion of the door of one of the ballot boxes showing the slide moved to uncover the ballot receiving slot therethrough.

Figure 6 is a similar view showing the slide moved to close the slot.

Figure 7 is a sectional view on the line 7—7 of Figure 6.

Figure 8 is a sectional view on the line 8—8 of Figure 6.

As disclosed by the drawings my improvement is in the nature of a suitcase or similar carrying case. The improvement comprises two similar sections which are preferably of substantially rectangular formation and which are indicated by the numerals 1 and 2 respectively. The sections are hingedly connected at one of their edges by means 3. Locking means, broadly indicated by the numeral 4 is provided for holding the sections in closed condition. The section 2 is provided with a handle 5 whereby the case can be conveniently carried to and from voting precincts.

The section 1 has its open face normally closed by a plate or flap 6, hingedly secured to the said case as at 7, and provided with means 8 for locking the same to the section or compartment 1. The flap 6 carries a handle 9 whereby the same may be swung to open position when the locking means is released.

The section 1 is designed to initially receive therein voting paraphernalia and which, after the same has been removed, is also designed as a storage for the voted ballots. The voted ballots are deposited in the section or compartment 1 through a slot 10, the said slot designed to be covered by a slidable plate which is automatically locked in slot covering position. As this construction is common with the removable ballot boxes hereinafter described, a detailed description thereof will not herein be attempted.

The section 2 provides a compartment for removable ballot boxes 11. These boxes are of a size to fully cover the compartment provided by the section 2. In the drawings three of such boxes are employed, but, of course, any desired number may be used, and in which instance the case is proportioned for the reception of such boxes.

Each box 11 has an open front normally closed by a hinged door 12, locking means 13 being provided for holding the doors closed. The keys which actuate the locking means of the several boxes are of different characteristics so that the key employed for opening one box will not open another box. This is also true with respect to the key that operates the locking means 8 for the hinged flap 6 of the section or compartment 1. On the doors of the nested ballot boxes 11 there are handles 14, whereby the doors 12 may be readily swung to open position.

The door 12 of each of the ballot boxes is provided with a somewhat elongated slot 15, similar to the slot 10. Each door has its inner face at the sides of the slot 15 provided with flanged guideways 16, and movable in the guideways there is a plate 17. Each of the slidable plates 17 carries a knob 18 whose shank passes through the slot 15. The slide 19 that covers the slot 10 is provided with a similar knob 20. Each slide, adjacent the end thereof provided with the knob is formed with a notch 21. Secured on the inner face of the door and on the inner face of the outer wall of the compartment or section 1 there is one end of an arched spring 22 that provides a locking dog. The active end of the dog is normally forced out of the notch 21 to permit of the slide riding thereover, but when the slide is moved to slot closing position and the knob thereof contacts with one of the end walls provided by the ballot receiving slot, the dog will automatically spring into the notch 21, and thus lock the slide from movement in either direction. Thus it will be noted that the ballot receiving slot cannot be uncovered until the door 12 of the ballot boxes 11 or the flap 6 of the section or compartment 1 is opened.

From the foregoing description, when taken in connection with the drawings, it will be noted that I have provided a ballot box which may be easily and conveniently transported to and from voting precincts, and wherein the ballot receiving openings are closed and automatically locked after being voted, and while I have herein set forth a simple and satisfactory embodiment of my improvement as it now appears to me, I desire it understood that I may make such changes therefrom as fairly fall within the scope of what I claim.

Having described the invention, I claim:—

A ballot box including a carrying case comprising two hinged sections, and means for locking the same together, a hinged flap for closing the open face of one of the sections, means locking the flap on the section, said section having a ballot receiving slot therethrough, a slide movable to cover the slot, means for automatically locking the slide in such position, the second section of the case providing a section for removable ballot boxes, each of which having a normally closed and locked hinged door provided with slots for the passage of ballots, a slide for covering each of the slots, and means for automatically locking the slides in slot covering position.

In testimony whereof I affix my signature.

MARION M. McFARLAND.